United States Patent [19]

Wolff et al.

[11] Patent Number: 5,044,205
[45] Date of Patent: Sep. 3, 1991

[54] METHOD FOR MONITORING DEFORMATIONS WITH LIGHT WAVEGUIDES

[75] Inventors: Reinhard Wolff; Hans-Joachim Miesseler; Martin Weiser, all of Cologne, Fed. Rep. of Germany

[73] Assignee: Strabag Bau-AG, Cologne, Fed. Rep. of Germany

[21] Appl. No.: 571,838

[22] Filed: Aug. 24, 1990

Related U.S. Application Data

[63] Continuation of Ser. No. 101,844, Sep. 28, 1987, abandoned.

[30] Foreign Application Priority Data

Oct. 15, 1986 [DE] Fed. Rep. of Germany ....... 3635053

[51] Int. Cl.$^5$ .............................................. G01L 1/24
[52] U.S. Cl. .................. 73/800; 250/227.14
[58] Field of Search ........................ 73/800; 350/96.29; 250/227.14, 227.16, 227.18, 227.19

[56] References Cited

U.S. PATENT DOCUMENTS 4,654,520  3/1987  Griffiths ............................. 73/800 X
4,671,659  6/1987  Rempt et al. ..................... 73/800 X

FOREIGN PATENT DOCUMENTS 0025815  8/1984  European Pat. Off. .
2937824  5/1982  Fed. Rep. of Germany .

Primary Examiner—Jerry W. Myracle
Attorney, Agent, or Firm—Body, Vickers & Daniels

[57] ABSTRACT

A method for the monitoring of deformation of components with light waveguides which are connected securely to the component at least over part of the length of the latter and are connected to a measuring apparatus with which the transmitting capacity of the light waveguide and the transit time and/or the damping of the light pulses sent through the light waveguides are continuously or intermittently monitored. The light waveguides are prestressed such that they remain in tension at all levels of deformation expected.

9 Claims, 1 Drawing Sheet

U.S. Patent     Sep. 3, 1991     5,044,205
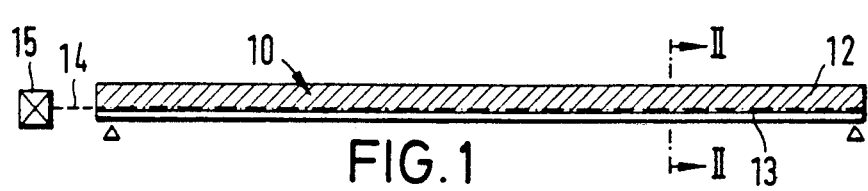
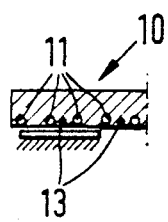
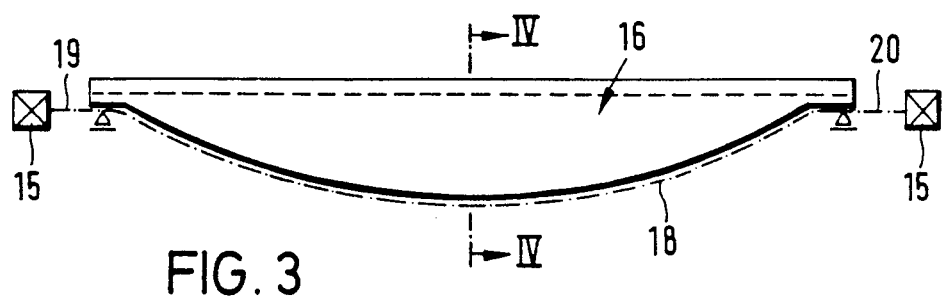
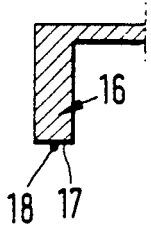
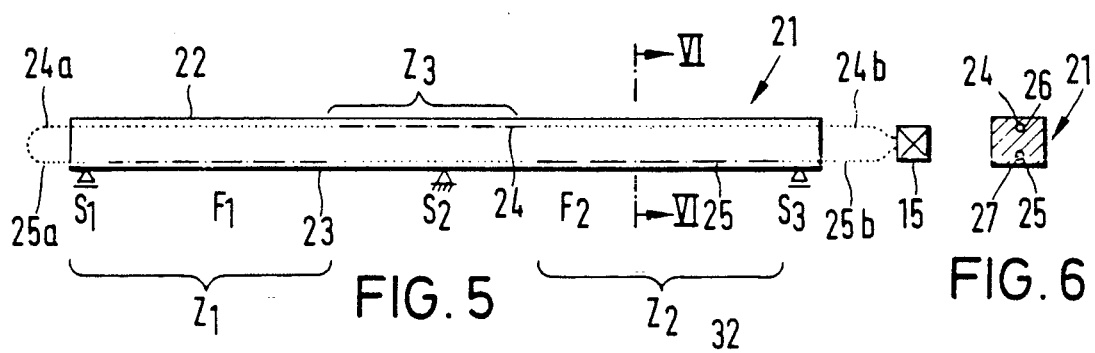
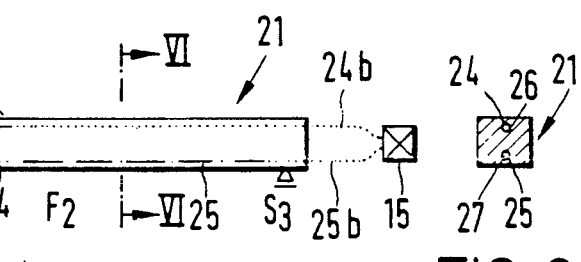
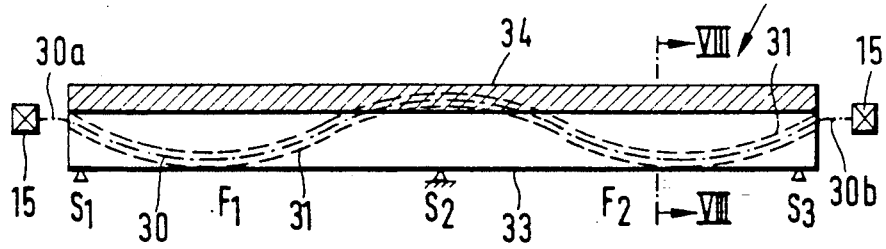
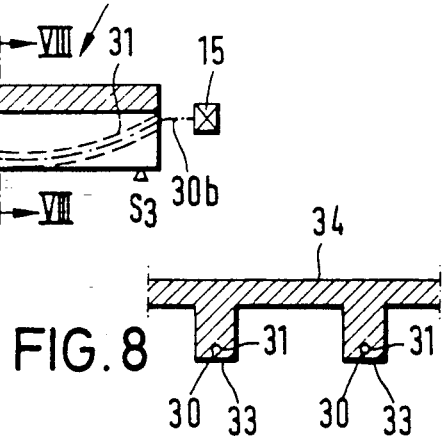
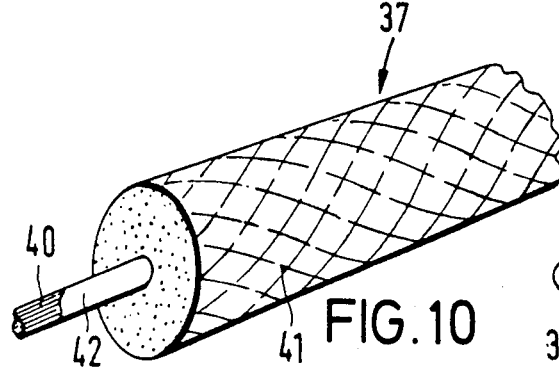
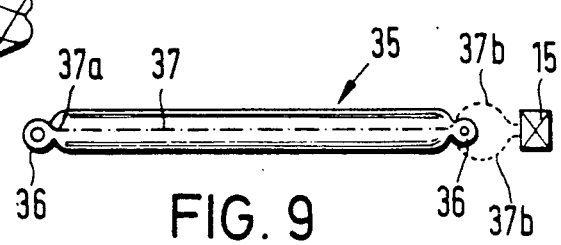

METHOD FOR MONITORING DEFORMATIONS WITH LIGHT WAVEGUIDES

This is a continuation of Ser. No. 101,844 filed 09/28/87, now abandoned.

The invention relates to a method for the monitoring of deformations of components with light waveguides which are connected securely to the component at least over part of the length of the latter and are connected to a measuring apparatus with which the transmitting capacity of the light waveguide and the transit time and/or the damping of the light pulses sent through the light waveguides are continuously or intermittently monitored.

It is known to use light waveguides for monitoring components of machines and vehicles, especially aircraft, but components of building structures also, so as to detect at an early stage deformations which give advance warning of fracture or other failure of the component in the machine or in the building structure. The light waveguides used in such cases consist of one or more very thin light-conducting fibres of quartz glass with a high refraction index which are embedded in a protective covering of fibre compound material e.g. glassfibre-reinforced synthetic plastic material. Extension of the light waveguides in the longitudinal direction leads to transverse contraction of the light-conducting fibre, which has a damping effect on the light pulses which are sent through the light-conducting fibre. This damping effect is a measure of the extension of the light-conducting fibre. When the elastic limit of the light-conducting fibre is exceeded, fracture of the light-conducting fibre occurs, and the fibre no longer transmits the light pulse at the fracture zone but instead reflects it. From the discontinued transmitting capacity of the light-conducting fibre and the transit times measured by the measuring apparatus it is possible to determine the distance between the fracture point and the measuring apparatus or the distance from the fracture point to the end of the light waveguide.

When monitoring components which are subjected to tensile stress it is known to secure the light waveguide adhesively to the outside of the component being monitored or to embed the light waveguide in the component (DE-OS 29 37 824). Then the beginning and end of the light waveguide are connected to a light transmission monitoring apparatus with which the ability of a light beam to travel through the waveguide, and the damping of the light beam in the waveguide, are monitored.

With these known methods and the known light waveguides it is only possible to reliably monitor components wherein only tensile stresses occur. On the other hand it is not possible to monitor components wherein there are different stress states distributed over the cross-section. Such components include for example parts of a building structure which are subjected to tensile and compressive and/or flexural stress, and wherein different stress states occur in the cross-section over the length of the component. For the known light waveguides have the property that the light-conducting capacity of the light-conducting fibres also varies when subjected to longitudinal pressure forces, in other words when the light-conducting fibres are subjected to upsetting. If, then, a light waveguide is connected over its entire length to a component wherein regions with tensile stress and compressive stress alternate, the light waveguide secured to the component will also be locally stretched and locally upset, and both extension and upsetting will subject the light-conducting fibre to forces which produce damping effects in the fibre which can no longer be associated with one specific stress.

The use of the known monitoring methods and light waveguides can also not be extended to provide precise monitoring of components which are subjected to time-dependent deformation for example shrinking, or creep under load. Also in the case of components which shorten under load or simply through reduction of their volume in the course of time the light waveguide connected securely to these will be upset such as to result in wrong measurements.

The invention has as its object, therefore, to provide a method for using light waveguides for the monitoring of components which are subjected to alternating or pulsating stresses, or time-dependent deformation phenomena. A further object of the invention is to provide a light waveguide which can be used for such a purpose. These objects are achieved by the measures and features specified in the claims.

Prestressing the light waveguides before they are connected to the building structure achieves the result that it is possible to measure not only extensions but also upsettings of the component being monitored since they are presented simply as a reduction in the pre-extension of the light-conducting fibres which results in definable damping variations in the light-conducting fibres. In this connection it is immaterial what caused this reduction in the pre-extension. Therefore, the light waveguides can monitor not only components wherein compression zones and tension zones alternate over the length of the component, such as occurs for example in continuous girders of building structures, but they can also be used for the monitoring of components which are subjected to time-dependent deformations, for example prestressed concrete building components which not only shrink but also creep under the effect of their prestressing. Prestressed light waveguides are also suitable for the monitoring of machine parts such as double-acting pistons or connecting rods which are subjected to both tensile and compressive stress.

The light waveguides can be taken along the component along a rectilinear course or a curved course, mechanically prestressed in situ and thereafter connected securely over their entire length to the component. It is possible to attach the light waveguides adhesively externally to the component, or to embed them directly in the material of the component, or to guide them in casing tubes arranged externally on the building structure or laid in the interior of the component. After the waveguides are laid in casing tubes these casing tubes can be grouted with a composition securely connecting the light waveguide to the casing tube over the full length, so as to establish the desired bond with the component.

In order to detect only the extensions which occur in a component subjected both to tensile and also to compressive stresses, using light waveguides extending through in rectilinear manner in the longitudinal direction, it is advantageous for the light waveguides to be connected securely only in the region of the tension zones to the component which is being monitored, but to guide the light waveguide otherwise so as to be longitudinally movable relatively to the component before it is connected to the measuring apparatus. For such an arrangement it is advantageous to lay the light waveguides in casing tubes where these tubes are then grouted only in the tension region of the component after the prestressing of the light waveguides. The light waveguides then detect only extension phenomena in the tension region, whereas upsetting phenomena in the compression region have no influence on the light waveguides, upsetting being able to reduce the sensitivity of the measurement work.

Measuring accuracy can also be improved according to the invention by arranging the light waveguides on or in the component to follow the tensile stress pattern. In such an event the light waveguides, for example in a continuous girder, are disposed above the supports in the upper part and in the bays between the supports in the lower part of the continuous girder, and are arranged similarly to the prestressing elements in a prestressed continuous girder. It is also possible to lay the light waveguides together with the prestressing wires in the casing tube of a prestressing element. Alternatively the light waveguides may be arranged separately in the interior of the component, following the tensile stress pattern, in their own casing tubes, or secured adhesively on the outer surface of the component, for example on the side wall of a beam, a machine bed or a vehicle part.

Light waveguides usually consist of at least one light-conducting fibre and an envelope surrounding same, and this envelope can be made from fibre compound material or advantageously from a synthetic plastic material e.g. polyamide or polyurethane. Fitting and handling the light waveguides are considerable facilitated if the light-conducting fibres are prestressed relatively to their envelope as early as at the manufacture of the light waveguides, and then, in this state, arranged on the component or embedded in it. The light waveguide then has an internal stress state, the preload light-conducting fibre bearing against its envelope. Then it is no longer necessary to prestress the light waveguide in situ, and instead it can be simply secured in its prefabricated form on the component which is to be monitored and connected to the said component over its entire length. Such light waveguides prestressed in themselves can be used with particular advantage for the monitoring of prestressed components which are subjected in the first instance to compression owing to their prestressing, and shrink and creep under this compressive prestressing.

Manufacture of a light waveguide whose light-conducting fibres are connected with preload to their protective casing can be carried out in a simple manner with the application of a braking action continuously on the reel from which the light-conducting fibre is drawn off when the envelope is produced. As a result a tensile stress is produced in the light-conducting fibre, and maintained, which is considerable enough to ensure that even at the upsetting of the light waveguide which can be expected as a result of the building structure the extension of the light-conducting fibre does not become less than nil. In manufacture, this predetermined tensile stress is maintained until a henceforth unreleasable bond with the fibre strands of the envelope is established, and the tensile stress of the light-conducting fibre is transferred over its entire length to the envelope.

Further features and advantages of the invention are shown in the following description and the examples of application, which are explained in more detail through the drawings. In the drawings:

FIG. 1 is a view in longitudinal section showing a reinforced concrete slab resting freely on support, with prestressed light waveguides embedded in the structure concrete, FIG. 2 shows the subject of FIG. 1 in a partial cross-section taken on the line II—II, FIG. 3 shows an edge beam, constructed as a fishbellied girder, of a freely supported slab-and-beam component, with prestressed light waveguides secured adhesively on the underside, in a side view, FIG. 4 shows the subject of FIG. 3 in a cross-section taken on the line IV—IV, FIG. 5 shows a rectangular continuous girder extending over two bays, with a light waveguide situated within the girder, in a side view, FIG. 6 shows the subject of FIG. 5 in a cross-section taken on the line VI—VI, FIG. 7 is a view in longitudinal section of a slab-and-beam component which is made of prestressed concrete and which extends over two bays, with prestressed light waveguides laid in casing tubes, FIG. 8 is a view of the subject of FIG. 7 in a cross-section taken on the line VIII—VIII, FIG. 9 is a side view showing an articulated joint rod made of steel and usable in machinery or in vehicle construction, with a prestressed light waveguide adhesively secured at two sides opposite from one another on the external periphery and FIG. 10 is a perspective fragmentary view on a greatly enlarged scale of a prestressed light waveguide according to the invention.

In FIGS. 1 and 2 there is shown a prestressed concrete slab 10 whose prestressing wires 11 are prestressed in the prestressing bed before the concrete 12 is introduced into the formwork and hardened. Between the prestressing wires 11 light waveguides 13 are arranged which extend parallel to the steel prestressing wires 11 and, like the latter, are mechanically prestressed to such an extent before the introduction of the concrete 12 in the prestressing bed that their stressing remains in the tension range under all stresses to which the prestressed concrete slab may be subjected in use.

After the introduction and setting of the concrete 12 the steel prestressing wires 11 and the light waveguides 13 are released from their anchoring points at the prestressing bed before the prestressed concrete slab 10 is removed from its formwork. The preload force within the steel prestressing wires 11 is then transferred by them, by the bond produced by static friction, to the concrete 12 so that the latter is subjected to compressive prestress in the longitudinal direction of the prestressing wires 11. Like the prestressing wires 11 the light waveguides bear on the concrete, they being connected to the concrete over all of the length by static friction after the concrete has set.

The light waveguides 13 are made to lie between the steel wires 11 in the plan of the slab 10, and their two ends 14 are connected to a measuring apparatus 15 which sends light pulses through the light waveguides 13 and receives the pulses again.

Under its own weight and under service load the prestressed concrete slab 10 is subjected to bending stress, which results in tensile stresses occurring at its underside and compressive stresses at its topside. Superimposed on this external stress state are internal compressive stresses which by the prestressed steel wires in the concrete cross-section and which are effective in the reinforced concrete slab even before the latter is fitted and comes under service load. Under the influence of the prestress the concrete begins to creep, i.e. the concrete is upset by the action of the compressive preload, and the prestressed concrete slab becomes shorter in the longitudinal direction. As this happens, the light waveguides embedded in the concrete also shorten, to the same extent, they being connected fast to the concrete over their entire length. But since before they are covered with concrete the light waveguides were prestressed and were given a pre-extension, their shortening as a result of the creep in the concrete surrounding them only results in reducing the extension of the light waveguides, without going below the extension zero point. In other words, the light waveguides are not upset by the creep deformation of the prestressed concrete slab, but remain within the tension range. After the prestressed component 10 has been installed in a building structure, and the service load has been applied, they can then monitor the deformation phenomena in the component which result from the service load and which subject the prestressed concrete slab 10 to bending stress and produce at its underside tensile stresses which are presented as extension of the light waveguide, causing a modification of the damping of the light in the light waveguides, which modification can be detected by the optical measuring apparatus 15 and evaluated.

In FIGS. 3 and 4 the component to be monitored is a slab-and-beam component 16 of ferroconcrete or prestressed concrete which is constructed as a fishbellied girder and on whose underside 17 a light waveguide 18 is arranged whose two ends 19 and 20 are connected to light measuring apparatus 15. In the constructional example illustrated here the light waveguide 18 has been mechanically prestressed after application on the component 16, and then secured adhesively over its entire length to the component 16.

FIGS. 5 and 6 show a reinforced concrete beam 21 which is rectangular in cross-section and which extends as a continuous girder over two bays $F_1$ and $F_2$ and rests on three supports $S_1$, $S_2$, and $S_3$. On the topside 22 and on the underside 23 of the beam 21 light waveguides 24 and 25 are arranged which are connected to one another at their left ends 24a and 25a respectively and are connected with their right-hand ends 24b and 25b respectively to a light measuring and monitoring apparatus 15. The light waveguides 24 and 25 are situated in casing tubes 26 and 27 respectively, of which the one casing tube 26 is arranged at the upper edge 22 and the other casing tube 27 at the lower edge 23 of the beam, rectilinearly and parallel to the longitudinal axis of the beam, and embedded in the structure concrete. The casing tubes, which may be flexible tubes of metal or synthetic plastic material or thin-walled sheet metal tubes, are laid in the component formwork before the beam 21 is concreted, and are concreted-in. The light waveguides may be introduced into the casing tubes before or after the concreting. After the concrete has set they are mechanically prestressed, and connected to the casing tube in the respective tensile stress regions $Z_1$, $Z_2$, $Z_3$ by forcing-in a hardening composition which adheres securely to the light waveguide and to the casing tube. Those portions of the light waveguides 24 and 25 which are connected fast to the casing tubes, under longitudinal prestress, are represented in the drawings in dot-dash lines, and it will be seen that they are situated at the lower edge of the beam 21 in the region of the bays $F_1$ and $F_2$ and at the upper edge 22 of the beam 21 over the central support $S_2$. Outside of the tension regions $Z_1$, $Z_2$ and $Z_3$ the light waveguides 24 and 25 remain capable of moving longitudinally in their casing tubes 26 and 27, this being represented in FIG. 5 by dotted lines. The longitudinally movable light waveguides are disposed in the structure in zones where no tensile stresses occur. But it should be pointed out that the light waveguides 24 and 25 can also be connected fast to the casing tubes over their entire length after the prestressing if according to the invention their prestressing and thus their pre-extension is so great that their tensile stress is continued even in the compression zones of the component.

In FIGS. 7 and 8 the invention is illustrated with the example of a continuous girder with a slab-and-beam cross-section, wherein the light waveguides are arranged in the component so as to follow the tensile stress pattern.

Just as in the constructional example illustrated in FIGS. 5 and 6, the light waveguides 30 are situated in casing tubes 31 which are taken along an undulatory course in the longitudinal direction of the girder 32 such that they are always situated in the tension zones of the particular girder cross-section concerned. The casing tubes 31 with the light waveguides 30 thus run in the bays $F_1$ and $F_2$ in the vicinity of the lower edge 33 and above the support $S_2$ in the vicinity of the upper edge 34 of the slab-and-beam component, whereas their ends 30a and 30b which are taken out of the component 32 are connected to light measuring and monitoring apparatus 15. Here also, as in the previously described constructional example, the casing tubes 31 are laid in the position shown in FIG. 7 in the formwork of the concrete component, and concreted-in. Then the inserted light waveguides are subjected to prestress and connected over their entire length to the casing tube by forcing-in a grout into the casing tube which adheres fast to the casing tube and to the light waveguide and thus establishes the bond between the light waveguide and the component.

It should be pointed out that the components 16, 21 and 32 shown in FIGS. 3 to 7 can also be subjected to longitudinal prestress if they are made of concrete and an advantageous stress is to be achieved. Especially in this case they will undergo creep deformation, which also acts on the concreted-in or stuck-on light waveguides and makes prestressing of these necessary if satisfactory monitoring in the service state is to be ensured.

FIG. 9 shows an articulated joint rod 35 made of steel such as is often used in mechanical engineering and in vehicle construction and which is provided with joint eyes 36 at its two ends. The articulated joint rod 35 can be subjected to tensile or compressive stress in the longitudinal direction. To monitor its stressing there are adhesively secured to diametrally opposite sides of the rod, in the longitudinal direction of the rod, light waveguides 37 which are connected to one another at one of the ends 37a whereas their other ends 37b are connected to a light measuring and monitoring apparatus 15. The light waveguides 37 used in this case are prestressed not against the component 35 but in themselves, i.e. they have an inherent stress state. One such light waveguide 37 is shown diagrammatically in FIG. 10.

This light waveguide 37 consists of a light-conducting fibre 40 made of quartz glass or another light-conducting material, which is embedded in an envelope 41 of fibre compound material. To obtain a good adhesion bond between the light-conducting fibre and the fibre compound material it is also possible to arrange on the outer periphery of the light-conducting fibre 40 an intermediate layer 42 having a rough surface, or a wire helix, which additionally increases the response sensitivity of the light waveguide when the latter is elongated, as is known per se. But as compared with the known arrangements the light waveguide according to the invention has the feature that the light-conducting fibre 40 is prestressed relatively to the envelope 41 surrounding it and is connected under axial tensile stress over its entire length to the envelope 41. Thus an internal stress state prevails within the light waveguide.

A simple way of manufacturing the light waveguides of the kind shown in FIG. 10 and used in the articulated joint rod according to FIG. 9 is that when the light-conducting fibre is brought together with its envelope the reel from which the light-conducting fibre is drawn off is braked to produce in the said fibre a tensile stress which is maintained until the envelope has set and a henceforth non-releasable connection is established between the light-conducting fibre and the envelope which surrounds it. The braking action of the reel is advantageously variable, so that the prestressing of the light-conducting fibre relatively to its envelope can be varied and adapted to the then actual requirements.

The light waveguide produced in this way and prestressed in itself can be cut to any length from a supply and applied loose to be secured to the particular component being monitored, along any line especially including curved lines, for example by adhesive securing, or incorporated in the mass of the component. It may include not one but several light-conducting fibres, which are arranged in the same envelope and may also be subjected to differing prestress, so that the same light waveguide can be used for different load ranges, in which case either the one or the other, or both, light-conducting fibres are connected to the optical measuring and monitoring apparatus.

The invention is not limited to the constructional examples which have been illustrated and described, and instead a plurality of modifications and additions are possible without departing from the scope of the invention. For example it is possible for the light waveguides of a plurality of components to be connected to one another and connected jointly to an optical measuring and monitoring apparatus. Moreover light waveguides prestressed both relatively to the component and also in themselves can be used for the monitoring of the most varied components of vehicles, machines, building structures etc. which are subjected to pulsating or alternating load and deformation.

We claim:

1. In a method for monitoring deformations of components by means of light waveguides which are connected securely to the component at least over part of the length of the latter and are connected to a measuring apparatus with which the transmitting capacity of the light waveguides and the transit time and/or the damping of the light pulses sent through the light waveguides are continuously or intermittently monitored, the improvements comprising: a light waveguide being mechanically prestressed at least to such an extent before being securely connected to the component that at all levels of deformation to be expected in the component the stressing of said waveguides remains in the tension range; said light waveguide being laid in a casing tube arranged within or outside of the component and connected securely thereto; and, said light waveguide being mechanically prestressed in said casing tube and connected securely to said casing tube by grouting said casing tube with a composition which adheres to said tube and to said light waveguide.

2. The improvements according to claim 1, wherein said light waveguide is connected fast to said casing tube surrounding it only in the tensile stress region of said component, and in the remaining regions of said component is guided to be longitudinally movable in said casing tube.

3. A method for monitoring deformations of at least one component by means of light waveguides having a length comprising the steps of:

prestressing said light waveguide such that said waveguide remains in tension at all levels of deformation to be expected in said at least one component;

securing said waveguide to said at least one component continuously over at least one appreciable portion of said waveguides length; and measuring at least one characteristic of light transmitted through said waveguide.

4. The method of claim 3 wherein said characteristic is selected from the class of characteristics comprising transit time and damping.

5. The method of claim 3 wherein said at least one component has a length and said waveguide is secured to said at least one component over substantially the entirety of said length by adhesive bonding.

6. The method of claim 5 wherein said waveguide is secured within a casing tube and said casing tube is secured within said at least one component.

7. The method of claim 6 wherein said waveguide is only prestressed in region of anticipated deformation of said at least one component.

8. The method of claim 5 wherein said waveguide is secured within a casing tube and said casing tube is secured outside said at least one component.

9. The method of claim 8 wherein said waveguide is only prestressed in region of anticipated deformation of said at least one component.

* * * * *